Figure 1:
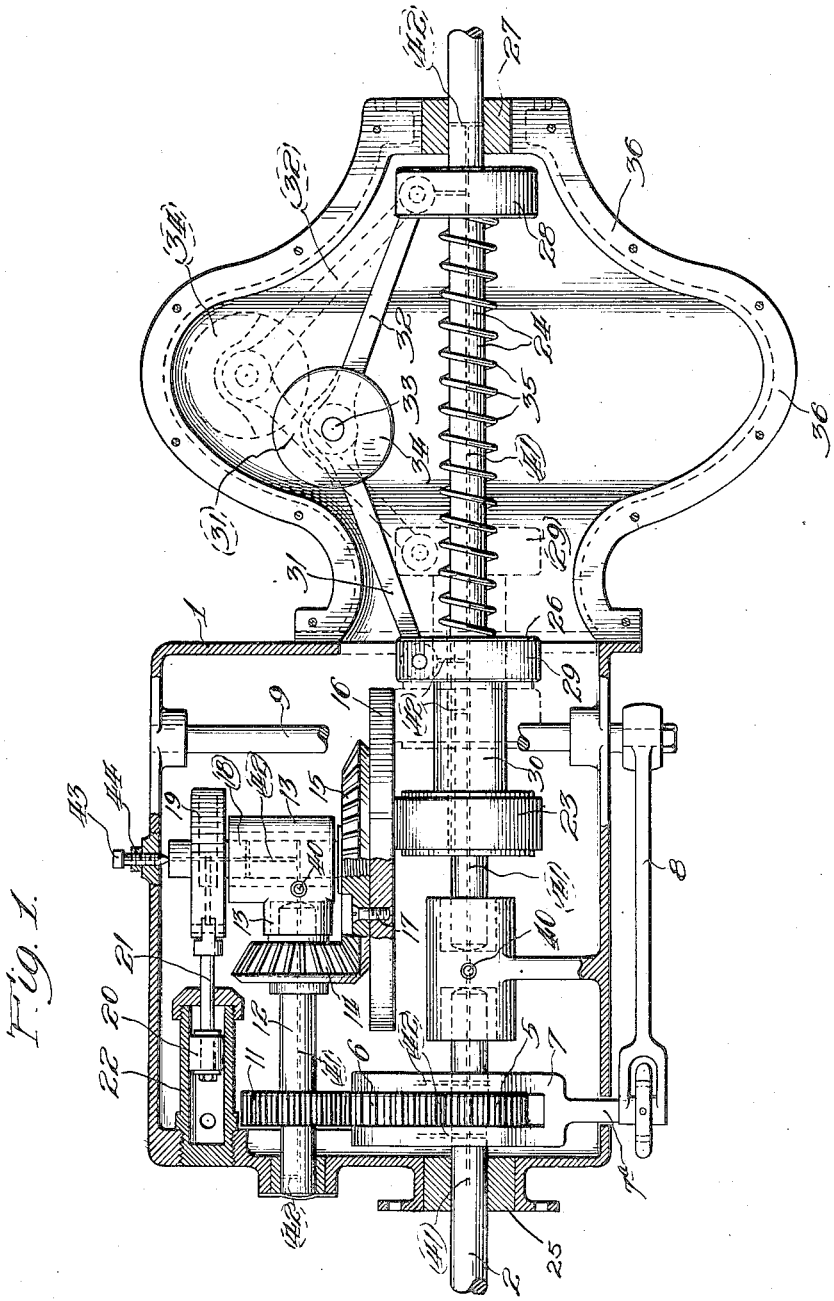

Aug. 7, 1923.

W. H. CLINGMAN 1,463,919

TRANSMISSION MECHANISM

Filed Jan. 13, 1922

2 Sheets-Sheet 1

Witness:
Stephen J. Rebora

Inventor:
William H. Clingman.
By Frank L. Belknap, Atty.

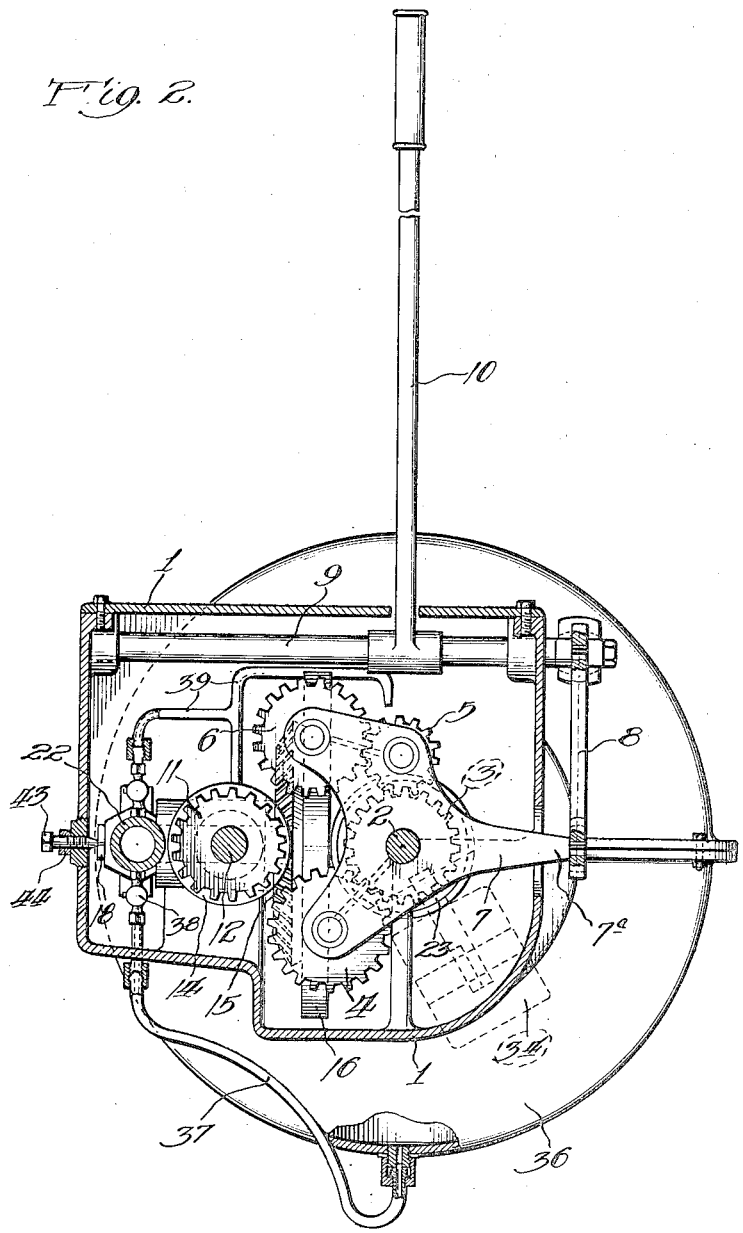

Patented Aug. 7, 1923.

1,463,919

UNITED STATES PATENT OFFICE.

WILLIAM H. CLINGMAN, OF CHICAGO, ILLINOIS.

TRANSMISSION MECHANISM.

Application filed January 13, 1922. Serial No. 528,930.

*To all whom it may concern:*

Be it known that I, WILLIAM H. CLINGMAN, a citizen of the United States, residing in the city of Chicago, county of Cook, and State of Illinois, have invented certain new and useful Improvements in Transmission Mechanism, of which the following is a specification.

This invention relates to improvements in transmission mechanism and refers more particularly to transmission mechanism for motor vehicles, whereby power is transmitted from an engine motor or other power source to either the rear or front axle of a vehicle.

Among the important objects of the invention are to provide a mechanism in which the objectionable shifting of gears is obviated, and mechanism which is automatic in its operation to transfer at all times the maximum power of the motor and to automatically reduce the gear ratio at respective speeds so that the operator has available at each speed, the maximum power of the motor.

Fig. I is a plan view of the mechanism with parts in section.

Fig. II is an end view showing the reversing means.

The transmission mechanism is of friction type and is enclosed in a gear casing 1 which has mounted therein shaft 2 which is directly connected to the source of power not shown. Upon this shaft is fixedly mounted a pinion gear 3 which rotates with the shaft and meshes with pinions 4 and an idler pinion 5 which are mounted with a third pinion 6 meshing with the idler gear 5 on a pivoted reversing member 7. An arm of this member 7ª extends outside of the casing 1 and is operated through the link 8 and rock shaft 9 by the shift lever 10 which extends above the floor board and in convenient position for the operator or driver. Between the gears 4 and 6 is positioned a gear 11 mounted on a shaft 12, one end of which is carried by the casing 1, the other bearing in the standard 13 which is rigidly supported in the casing. A beveled gear 14 also mounted on the shaft 12 meshes with the larger beveled gear 15 fixedly attached to the friction plate 16 by means of screws shown at 17. The friction plate and beveled gear are mounted upon a shaft 18 positioned at right angle to the shaft 12 and likewise supported by the bearing standard 13. Near the opposite end of the shaft 18 to which the friction plate is mounted, is an eccentric mechanism 19 which in its rotation drives the piston 20 through the connecting rod 21 which reciprocates in the pump cylinder 22, the latter being screwed into the frame 1. The function of this pump is to supply oil to the different parts of the mechanism as will hereinafter be described.

The friction disk 16 contacts with the friction gear 23 which is mounted upon the propeller shaft 24. This shaft is supported in bearing 25 in the gear casing and bearing 27 in the governor casing. Any type of driving contact may be utilized between the stub shaft 18 and the propeller shaft 24. A friction drive has been shown in the drawing as this is a relatively simple and effective means for producing the results desired. On the shaft 24 is also mounted an automatic governor mechanism which comprises fixed collar 28 and slidable collar 29 fixedly connected to the friction gear 23 by the cylindrical web 30 so that the collars 28 and 29 rotate with the gear 23 which is driven as explained, from the friction disk 16. Connecting the collars 28 and 29 and pivoted thereto are the lever arms 31 and 32. These are pivotally connected at 33 so that when the governor which comprises lever arms 31 and 32 supporting a weight 34 is spread as shown in the full line position, the collars 28 and 29 will assume their most remote positions as shown in the full line, due to the force of the compression spring 35. At high speed the centrifugal force of the weight 34 on the governor will overcome the force of the compression spring and draw the collars closer together reducing the angle between the lever arms as shown in the dotted line position. At this time the friction gear will be drawn by the force of the governing mechanism toward the outer circumference of the friction plate, thus, as the speed of the engine is increased, the friction disk rotating at increasing speeds will increase the rotative speed of the friction gear 23 and hence the speed of the shaft 24. As explained, this increased speed of the shaft 24 and governing mechanism fixedly attached thereto, will draw the friction gear toward the outer circumference of the disk and when the engine speed is decreased in a like manner, the governing mechanism will function to move the friction gear back toward the center of the friction disk thus transmitting at all times a maximum power to the vehicle wheels.

The advantage of such power transmission is readily appreciated in that the positive connection which exists continuously between the source of power and the propelling shaft supplies thereto the most efficient power and reduces to a great extent, stress or strain upon the power source. With a transmission mechanism of this type, when operating under heavy road conditions, it will be unnecessary to race your engine to procure satisfactory power as the engine will take up the load at the lowest speed and gradually increase as conditions permit. The mechanism allows the operator to rely wholly upon his engine speed for increasing or decreasing the speed of the vehicle rather than relying upon the speed of the engine and gear ratios for selectively choosing the desired speed of locomotion of the vehicle.

To reverse the device it is only necessary to move the shift lever 10 so that the gear 6 is meshed with the gear 11 thereby including the idler gear 5 in the train of connections between the drive and propeller shafts in place of the single gear 4.

To oil the mechanism, oil is withdrawn from the bottom of the governor casing 36 to which it is supplied from any convenient source through the line 37 in which is interposed a check valve 38. The oil, through this line, is introduced to the pump 22 and is driven therefrom through the pressure line 39 to numerous oil connections 40. These oil connections supply oil to ducts 41 running longitudinally of the respective shafts and supplying oil to the different bearings through the secondary ducts 42. Connection between the casing 1 and the governor casing 36 is such that the oil will gravitate freely to the lowest portion of the latter casing from which it is again recycled through the oil system as described. This prevents any accumulation of oil in the casing 1 which would reduce the efficiency of the friction contact between the friction disk 16 and the friction gear 23. A set screw 43 set in position by lock nut 44 contacts the end of the shaft 18 and serves to regulate the frictional contact between the disk 16 and the friction gear 23.

The transmission mechanism is adapted to use on any type of machine and due to the direct, continuous and positive drive which is effected through the mechanism, the operation of the vehicle is smooth, the pick-up is rapid and the operator has at all times the advantage of maximum energy from his power source.

I claim as my invention:

A transmission mechanism, comprising a drive shaft, a propeller shaft, and a transmission shaft for transmitting power from the drive shaft to the propeller shaft, gear wheels on said drive shaft and said transmission shaft adapted to rotate therewith, a swinging substantially Y shaped yoke journaled on said drive shaft and spanning the gear wheel thereon, a forward drive gear carried by said yoke at one side and meshing and reversing gears carried by the opposite side of said yoke, means for shifting said yoke to throw either the forward drive speed gear in mesh with the gears on the drive shaft and the transmission shaft or the reverse gearing into mesh with said gears whereby the transmission shaft is driven in a forward or reverse direction, a friction disk geared to the opposite end of said transmission shaft, a support for said disk disposed at right angles to said transmission shaft, a friction drive wheel slidably mounted on said propeller shaft having its periphery contacting with the face of said friction disk, and means for shifting said drive wheel across the face of said disk to vary the speed of the propeller shaft.

WILLIAM H. CLINGMAN.